US012412162B2

(12) United States Patent
Pospieszalski

(10) Patent No.: US 12,412,162 B2
(45) Date of Patent: Sep. 9, 2025

(54) CRYPTOGRAPHICALLY SECURED HYBRID (ON AND OFF BLOCKCHAIN) CRYPTOCURRENCY SYSTEM

(71) Applicant: MatterFi, Sheridan, WY (US)

(72) Inventor: Michal Pospieszalski, West Hollywood, CA (US)

(73) Assignee: MatterFi

( * ) Notice: Subject to any disclaimer, the term of this patent is extended or adjusted under 35 U.S.C. 154(b) by 285 days.

(21) Appl. No.: 17/583,189

(22) Filed: Jan. 24, 2022

(65) Prior Publication Data

US 2022/0253813 A1 Aug. 11, 2022

Related U.S. Application Data

(60) Provisional application No. 63/140,270, filed on Jan. 22, 2021.

(51) Int. Cl.
*G06Q 20/06* (2012.01)
*H04L 9/00* (2022.01)
*H04L 9/32* (2006.01)

(52) U.S. Cl.
CPC ......... *G06Q 20/065* (2013.01); *H04L 9/3247* (2013.01); *H04L 9/50* (2022.05); *H04L 2209/56* (2013.01)

(58) Field of Classification Search
CPC .... G06Q 20/065; G06Q 20/02; H04L 9/3247; H04L 9/50; H04L 2209/56; H04L 9/3239
See application file for complete search history.

(56) References Cited

U.S. PATENT DOCUMENTS

| | | | | |
|---|---|---|---|---|
| 9,565,020 | B1* | 2/2017 | Camenish et al. | H04L 9/0894 |
| 10,402,823 | B1* | 9/2019 | Vlasov et al. | G06Q 20/3829 |
| 11,316,691 | B2* | 4/2022 | Westland | H04L 9/3218 |
| 11,528,141 | B2* | 12/2022 | Konda et al. | H04L 9/3218 |
| 2018/0288022 | A1* | 10/2018 | Madisetti et al. | H04L 63/061 |
| 2020/0059364 | A1* | 2/2020 | Konda et al. | H04L 9/3234 |

(Continued)

OTHER PUBLICATIONS

Matt B, BIP47: Reusable Payment Codes for Hierarchial Deterministic Wallets, Mar. 27, 2019, Medium. (Year: 2019).*

(Continued)

*Primary Examiner* — Bennett M Sigmond
*Assistant Examiner* — George N. Proios
(74) *Attorney, Agent, or Firm* — Richard G. Topolewski

(57) ABSTRACT

A hybrid crypto process includes calling an on-chain smart contract function. The smart contract function receives a ghost blockchain address. Then the hybrid crypto function can call an oracle function with arguments that include the ghost blockchain address. The oracle function is associated to a program payment code and the oracle function can determine from the ghost blockchain address a payment code. If the request is to receive crypto assets, then the payment code is a sender payment code. The request may include a crypto asset amount and the oracle function may associate the crypto asset amount with the sender payment code. If the request is to send crypto assets, then the payment code is a destination payment code, and the oracle function returns a destination blockchain address. The ghost blockchain address may be generated according to BIP 33, BIP 47 or OBPPV5.

22 Claims, 4 Drawing Sheets

(56) References Cited

U.S. PATENT DOCUMENTS

2020/0328893 A1* 10/2020 Westland .............. H04L 9/3218
2022/0335422 A1* 10/2022 Pospieszalski et al. ....................
G06Q 20/3829

OTHER PUBLICATIONS

Amir Taaki, BIP 0033, May 15, 2012, Bitcoin Wiki,https://en.bitcoin.it/wiki/BIP_0033. (Year: 2012).*
John Galt, Open Bitcoin Privacy Project Ranks Winners and Losers for Wallet Privacy, May 20, 2015, Bitcoin Magazine. (Year: 2015).*
Andrey Sergeenkov, Reusable Payment Codes—the Secret Ingredient to a User-Friendly Crypto Wallet, Nov. 23, 2018. (Year: 2018).*
David Chaum, R.L Rivest, A.T Sherman "Blind Signatures for Untraceable Payments", Advances in Cryptology Proceedings of Crypto 82, pp. 199-203, 1983.
Jonaldfyookball, James Cramer, Unwriter, Mark B. Lundeberg, Calin Culianu, and Ryan X. Charles, "SLP Token Type 1 Protocol Specification 2018," [retrieved on Jan. 23, 2022]. Retrieved from the internet: <URL:https://github.com/simpleledger/slp-specifications/blob/master/slp-token-type-1.md>.
Ian Grigg, "The Ricardian Contract." Proceedings of IEEE Workshop on Electronic Contracting Jul. 6, pp. 25-31, 2004.
Ian Grigg, "Triple Entry Accounting 2005," [retrieved on Jan. 24, 2022]. Retrieved from the Internet: <URL:http://iang.org/papers/triple_entry.html.>.
Ben Laurie. "Lucre: Anonymous Electronic Tokens v1.8. Technical report 1999, 2008,".
Satoshi Nakamoto, "Bitcoin: A peer-to-peer electronic cash system 2008," [retrieved on Jan. 23, 2022]. Retrieved from the Internet: <URL:http://bitcoin.org/ bitcoin.pdf.>.
Chris Odom.,"Open-Transactions: Secure Contracts between Untrusted Parties 2010," [retrieved on Jan. 23, 2022]. Retrieved from the Internet: <URL:http: //www.opentransactions.org/open-transactions.pdf.>.
Chris Odom, "Triple Signed Receipts 2010," [retrieved on Jan. 23, 2022]. Retrieved from the Internet: <URL:http://opentransactions.org/wiki/index.php? title=Triple-Signed_Receipts.>.
Justus Ranvier, "Payment Codes," [retrieved on Jan. 23, 2022]. Retrieved from the Internet: <URL:https://www.reddit.com/r/Bitcoin/comments/3alzga/ bip47_reusable_payment_codes/.>.
Justus Ranvier, "Voting Pool Deposit Process." [retrieved on Jan. 24, 2022]. Retrieved from the Internet: <URL:http://opentransactions.org/wiki/index.php/Voting_Pool_Deposit_Process.>.
Justus Ranvier, "Voting Pool Withdrawal Process." [retreived on Jan. 23, 2022]. Retrieved from the Internet: <URL:http://opentransactions.org/wiki/index.php/Voting_Pool_Withdrawal_Process.>.
Justus Ranvier, "Voting Pools." [retrieved on Jan. 23, 2022]. Retrieved from the Internet: <URL:http://opentransactions.org/wiki/index.php/Voting_Pools>.
Justus Ranvier, "BIP-47 Specification 2015," [retrieved on Jan. 23, 2022]. Retrieved from the Internet: <URL:https://github.com/bitcoin/bips/pull/159.>.
Justus Ranvier, Jimmy Song, "Hierarchy for Colored Voting Pool Deterministic Multisig Wallets." [retrieved on Jan. 24, 2022]. Retrieved from the Internet: <URL:https://github.com/Open-Transactions/rfc/blob/master/bips/bip-vpc01.mediawiki>.
Justus Ranvier, Jimmy Song, "Hierarchy for Non-Colored Voting Pool Deterministic Multisig Wallets." [retrieved on Jan. 24, 2022]. Retrieved from the Internet: <URL:https://github.com/bitcoin/bips/blob/master/bip-0080.mediawiki>.
Bill St. Clair, "Truledger in Plain English, 2008." [retrieved on Jan. 24, 202] Retrieved from the Internet: <URL:https://nakamotoinstitute.org/truledger/>.

* cited by examiner

CRYPTOGRAPHICALLY SECURED HYBRID (ON AND OFF BLOCKCHAIN) CRYPTOCURRENCY SYSTEM

BACKGROUND OF THE INVENTION

Field of the Invention

This disclosure has to do with crypto currency and more specifically with cryptographically secured on and off blockchain transactions.

Background of the Invention

The Bitcoin blockchain, its derivatives and other blockchain based cryptocurrencies provide a 'foundation layer' of hard money, where transactions are irreversible and censorship-resistant, consisting of peer-to-peer payments secured by proof algorithms like proof-of-work.

Blockchain ecosystems are also a medium for issuing third party tokens. Third-party tokens allow the blockchain-based circulation of unique units of value from different issuers. Several protocols exist for third party tokens, for example Simple Ledger Protocol (SLP) for Bitcoin-based blockchains, and ERC-20 for Ethereum.

Blockchain users and custodians need solutions to a variety of identity problems, such as a reusable address that can be used as a public ID and that supports return addresses. Solving the problems of receiving addresses is important for usability and for unifying identity across blockchains.

Blockchain users also often deposit crypto assets with 3rd-party custodians such as exchanges for the increased functionality available there, like trading on markets. These 3rd-party custodians are historically where most theft and fraud have occurred, and the losses are in the billions.

Unfortunately, third party servers in use today are only trusted in the traditional way one puts trust in the institution. User have to trust the institution that custody of their cryptocurrency to properly run and secure the computers that hold the cryptocurrency, to accurately maintain their internal ledger and customer balances, and to faithfully execute transactions legitimately requested by users.

Crypto custodial institutions, for example currency exchanges and other trading platforms, usually desire to perform order matching more rapidly than is possible on the blockchain. Crypto custodial institutions accept custody of user cryptocurrency, perform transactions in a separate off-chain system like a traditional database to track customer account balances. Typically, the services provided are not cryptographically secured, or independently auditable. To use these crypto custodial institution services users give-up full control of their deposited crypto assets and have to trust the crypto custodial institution, which exposes them to the risk of theft or loss of their crypto assets (e.g. currency and coins).

Unlike legacy currencies, cryptocurrencies can be irrevocably lost or stolen, and it's typically not possible to distinguish between internal or external theft. Historically, this ambiguity appears to have been routinely exploited.

Ascertaining user identity is critical for many blockchain-based transactions. What is "identity," from a software perspective? A social security card or driver's license is not the sum total of one's identity, not even in court. Like a marriage license, or a dog license, or even a witness statement in an affidavit; each is just one piece of evidence about someone. More specifically, each piece of evidence about a person (i.e. a claim or set of claims) is a claim that has been certified by someone that others trust (i.e. an authentication authority). The someone, may either a person or an organization, like an official authority, like social security administration. These pieces of evidence (claims) are like a cloud of data formed about a person.

But even the cloud of data is not one's identity itself. Identity is ethereal. The cloud of data merely consists of various pieces of evidence about a person's identity, which is the closest we have come in the real world to tracking a person's identity. For example, having the name "Bill Gates" is not the same thing as being the Bill Gates who founded Microsoft. It's not the name alone, nor some singular taxpayer ID number that imbues identity, but rather, those names and numbers are just examples of verified (or verifiable) facts about that person.

A person's true identity is not tracked as anything more than a set of claims—and claims about those claims—regarding specific facts, relationships and accomplishments in that person's life, that distinguish the person from anyone else subjectively, in the eyes of those the person is interacting with. A user may create and control his own credentials, alternatively an authentication authority, may create and control a user's credentials.

However, even given a system where users have full control over their own cryptographic credentials, authorities may still be used, and authorities may set permissions or revoke access in their systems. What is needed is a system that provides a decentralized model of identity, provides users with self-determination, while ensuring that various organizations and platforms can still be in control and regulate their systems.

Many blockchain-based enterprises would like to be able to identify a user, and from there to be able to link that user to what they sign, the payments they make, the messages they send, and the claims that distinguish their identity along with authentications about those claims made by authorities.

The users of deposit-accepting services should never experience a loss of deposited crypto assets. Security threats to loss of deposited crypto assets may be grouped into three general categories:

Type 1 Event (Theft/Loss). A user permanently loses their crypto assets because a third party has gained control of them without the user's consent, or because the private keys needed to spend them have been irrevocably lost.

Type 2 Event (Denial of Service). A user temporarily loses some or all of their ability to use their crypto assets, but no third party has gained control over them.

Type 0 Event. Type 0 Events will be used to describe all other abnormal conditions from which the pool must recover which do not directly involve a loss of customer deposits What is needed is a cryptographic system that removes the need to trust the crypto custodian organization and provides solution to the identity and security problems identified above challenges.

SUMMARY OF THE INVENTION

A hybrid crypto process includes calling an on-chain smart contract function. The smart contract function receives a ghost blockchain address. Then the hybrid crypto function can call an oracle function with arguments that include the ghost blockchain address. The oracle function is associated to a program payment code and the oracle function can determine from the ghost blockchain address a payment code.

If the request is to receive crypto assets, then the payment code is a sender payment code. The request may include a crypto asset amount and the oracle arguments may include the crypto asset amount, and in this case the oracle function may associate the crypto asset amount with the sender payment code.

If the request is to send crypto assets, then the payment code is a destination payment code, and the oracle function returns a destination blockchain address.

The ghost blockchain address may be generated according to BIP 33, BIP 47 or OBPP Ver 5 (Oen Bitcoin Privacy Project version five). The payment code may have an associated user claim that is signed by a trusted private key, the hybrid crypto system may use the user claim for KYC-AML (Know your Customer-Anti-Money Laundering) compliance.

The program payment code may have an associated program claim, and the hybrid system may ensure the program claim is signed by a trusted private key before executing some capability.

DETAILED DESCRIPTION

Figure 1:
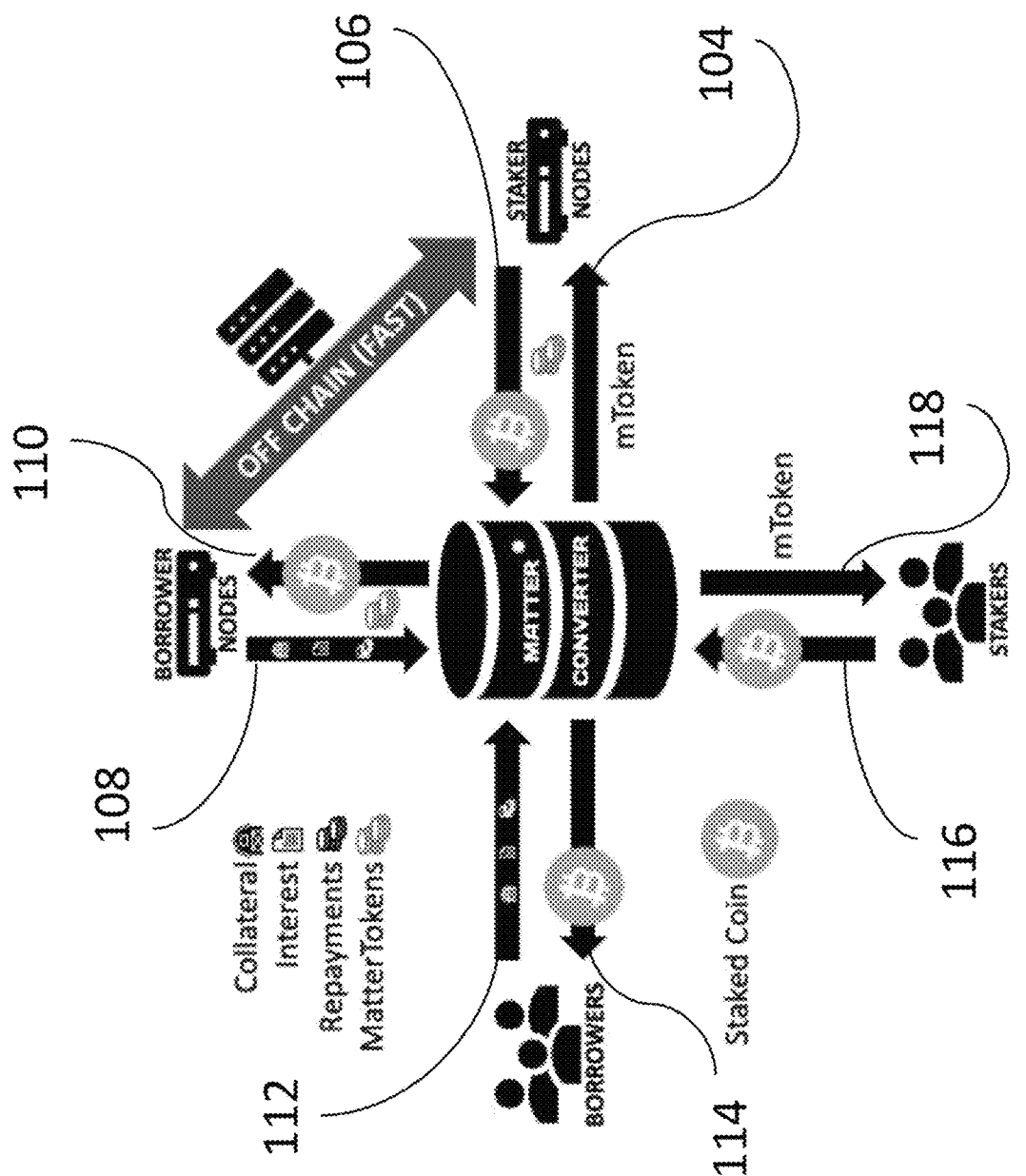
FIG. 1 provides an overview of the actors (Stakers and Borrowers) & (Staker & Borrower Nodes) with Matter Converter.

A hybrid crypto system providing the following which may be implemented with open protocols:

Actor crypto address, that a user may use to control identity and payments across multiple blockchains. An example of an actor crypto address may be a BIP-47 payment address. A simple actor crypto address may be a bitcoin wallet address, though standard best practices are to constantly be creating new bitcoin wallet addresses as is specified in BIP 32 and BIP 43 and BIP 44. The actor crypto address may have a single, re-usable address which may be used across many blockchains, with return addresses, privacy for on-blockchain transactions, and proof that any given deposit, payment or withdrawal really was sent to person identified as being associated to the actor crypto address.

Associated to actor crypto address may be user credentials for handling KYC-AML (Know Your Customer and Anti Money Laundering) regulatory requirements for regulated parties such as banks, while maintaining users' control over their own identity.

Issuer-controlled issuance of tokens on-blockchain, for example using Simple Ledger Protocol (SLP).

Server deposits for off-blockchain transactions of coins and tokens, based on a secure cryptographic sign and notarized messaging protocol, like the Open-Transactions standard.

The hybrid crypto system may provide currency agnostic integration of multiple blockchains and their derivatives.

The hybrid crypto system On-blockchain, off-blockchain, and cross-blockchain interactions.

A solution for theft and fraud wherever crypto assets are deposited with $3^{rd}$-party custodians, based on pools of servers that employ multisig (Multiple Signature) storage of crypto assets.

The above feature set allows for hybrid ("on" and "off" blockchain) Distributed Finance "DeFi" implementations where custodians can issue cross-chain moving tokens, DeFi smart contracts can run off-chain in specific jurisdictions, on-chain smart contracts can use fast processing off-chain multi-sig endpoints, and touring incomplete coins' smart contracts can be processed off-chain and returned on-chain.

Properly running the computers includes securing the computers and private keys.

The hybrid crypto system may have notary servers and audit servers. The notary server and audit server may implement crypto notary messaging like the Open-Transactions protocol. The notary servers security (that users trust) may be based on cryptographic proofs instead of institutional trust, allowing any willing parties who wish to contract with each other to enjoy the benefits of off-chain transactions without the need for institutional trust.

In this paradigm, transaction servers are demoted to mere notary server, with the ability to countersign contracts that have originated from a user (more specifically a user crypto address) and have been signed by the private key of the user crypto address. Since only each client (user) has access to its own private key, receipts are unforgeable by the notary server, that can only "timestamp" transactions as they come through, thus the notary server is incapable of creating a false receipt, since they lack the user's private key.

The notary server can thus—in a trustless manor—run off-blockchain transactions on the notary server based entirely on cryptographic proofs, thus making it possible to prevent theft of reserves in off blockchain transaction by storing blockchain coins and tokens in multi-signature voting pools (requiring X approvals from a pool of Y approvers, X-of-Y) that can only be moved after a signed receipt has received X approvals. The Y notary servers also audited by each other. Whenever a withdrawal needs approval, the auditors vote multisig on-blockchain to release crypto assets, but only when authorized by users' signed receipts. To build such a pool is enabled by using a server based on cryptographic proofs, which is different than traditional servers.

The hybrid crypto system may use an actor crypto address. The actor crypto address may provide a unified identity, for example a unified identity may be provided with an implementation of BIP-47 payment code, identity credentials, and blind claims.

The hybrid crypto system may employ a unified identity with Open-Transactions identity credentials, which allows users to make claims about themselves regarding their facts, relationships, and accomplishments. Moreover, anyone else (be it people, organization intuitions or government agency), e.g. trusted authorities, as colleagues, family members, etc. can cryptographically sign the claim to verify the claim. And it is in those authenticated claims where the hybrid crypto system can find the proofs needed for identifying each person according to the needs of the scenario, for example when an exchange performs a withdrawal for a user.

The hybrid crypto system may link a set of credentials to a specific re-usable ID (an actor crypto address) and its signatures. For example, the link may be made using the BIP-47.

An actor crypto address is another name for payment code.

An actor crypto address is an address that has an actor private key and an actor public key combined with a communication channel for sending messages to and from the actor crypto address.

The hybrid crypto system may use a hieratical deterministic wallet (HD wallet), like BIP 32. The hybrid crypto system may use the BIP-47 code in conjunction with identity credentials to create a publicly verifiable actor payment address.

An actor crypto address may be associated to an identity.

The actor crypto address may be used for Reusable Payment Codes which implement Hierarchical Deterministic Wallets. BIP-47 is based on BIP-44 which is an extension of BIP-32.

The BIP-47 Payment Code is a way to format blockchain addresses so that each actor can have a single (aka actor crypto address) that is a re-usable address. The actor crypto address may be able to be used across all blockchains. The actor crypto address may be able to be used for secure private two-way communication between actors of the hybrid crypto system. Actors may include users (e.g. stakers, borrowers, buyers, sellers etc.), and programs (for example the converter smart contract, notary servers and audit servers).

The actor crypto address for a user is also known as a user crypto address. The actor crypto address for user who is also a staker may also be known as a staker crypto address. The actor crypto address for user who is also a borrower may also be known as a borrower crypto address. The actor crypto address for user who is also a buyer may also be known as a buyer crypto address. The actor crypto address for user who is also a seller may also be known as a seller crypto address.

The actor crypto address for a program is also known as a program crypto address. The actor crypto address for a program running on a distributed ledger may also be known as smart contract crypto address. The actor crypto address for a notary server may also be known as a notary crypto address. The actor crypto address for an audit server may also be known as an audit crypto address. The program crypto address may be a smart contract crypto address, a notary crypto address, or an audit crypto address. An off-chain program crypto address may be a notary crypto address or an audit crypto address.

The actor crypto address may not appear in any on-blockchain transactions. Instead, the receiving addresses are calculated deterministically using for example a Diffie-Hellman shared secret. This is a process whereby each party, using his own private key and the other party's public key, is able to calculate a shared secret key, which no one else can calculate without one of the private keys. The parties may also increment an index after each transfer, so there is a new blockchain receiving address calculated for each transaction between them.

BIP-47 uses payment codes. A payment code includes in part a public key and BIP-47 provides a technique for creating payment addresses (for example Bitcoin addresses) that can be reused and publicly associated with a real-life identity without creating a loss of financial privacy. Payment codes are similar to stealth addresses but involve a different set of trade-offs and features that may make them more practical. A payment code may be used along with a counter party (i.e. another actor crypto address) private key to use Diffie-Hellman process to generate payment addressees.

Depending on the actor crypto address the hybrid crypto system may behave differently. For example, if the hybrid crypto system receives communication from a standard address then it may process it as normal and would need a return address to be provided for any returns. If the actor crypto address is from a hierarchical deterministic wallet with Diffie-Hellman determined addresses (for example BIP 47) then the hybrid crypto system may calculate the destination address to use when needed, for example to return or crypto assets (e.g. to pay-out coins or tokens).

The actor crypto address, like a BIP-47 payment code, may provide users with a single ID that can be used across different blockchains, without having to generate different ID (e.g. randomly generated IDs) for each blockchain, where that generated difference ID must be stored and cannot be deterministically derived again. The same ID will work on Litecoin, Bitcoin, Bitcoin Cash, etc.—any blockchain where the user holds a private key. The actor crypto address may work across all Bitcoin-derived blockchains, such as Litecoin, BSV, and Bitcoin Cash, as well as on-and-off blockchain. The hybrid crypto system may also allow the same actor crypto address to work on non-bitcoin-derived blockchains like Ethereum and EOS.

An actor crypto address, for example a BIP-47 payment code, may be freely published everywhere and serve as the user's 'public ID' without loss of security or anonymity.

Actors only need to exchange the actor crypto address, like BIP-47 payment codes, once. Thereafter, messages and payments, agreements, and smart contracts, including DiFi contracts themselves can safely flow between the actors, without having to exchange a new address (e.g. a new random address) each time.

The actor crypto address that is used for payments may also be used for messaging, and for signing messages that are sent, as well as for verifying signatures on messages received.

A third-party public observer will not see an actor crypto address in any of on-blockchain transactions, because the on-blockchain transactions use receiving addresses that are generated deterministically by both parties without having to transmit anything, using a Diffie-Hellman shared secret.

The counter parties to a transaction may see their entire history between each other. This is possible because each party has one of the private keys needed to generate the deterministic receiving addresses used for prior transactions with the other party.

So, when a message or payment is sent, a sender knows for certain who the recipient will be, and there is no ability for the recipient to provide some third party's receiving address instead of their own.

Also, when a user receives a payment, the recipient knows who the sender is. The recipient will see the sender's "display name" on the incoming payment, and can even hit 'reply' to send a payment or message back to the sender.

The above identity features of the hybrid crypto system may allow for use worldwide of on-chain and off-chain Defi. For example, a user may enter into a smart DeFi contract that may calculate a return or destination address using a smart contract oracle, specifically a destination address oracle. The destination address oracle may generate a destination address and the smart contract can use the destination address to send crypto assets (for example withdrawals, refunds, payments) to the actor crypto address.

The destination address oracle may be called to determine the destination address given a public key seed like a BIP-47 payment code. The destination address oracle may have a private key used in a Diffie-Hellman calculation along with the actors public key seed (like a BIP-47 payment code) to derive a shared secret number that may be used in establishing communication or encryption between the actor crypto address and the hybrid crypto system.

The communication between the smart contract and the oracle may be encrypted. The communication from the actor crypto address (e.g. crypto wallet) to the smart contract may be encrypted.

FIG. 1, the actor crypto address, (e.g. Staker Node, user wallet, staker wallet . . . ), invokes API on converter smart contract including a parameter that can be used as a payment code. The converter smart contract may call the destination address creator oracle (also known as destination address oracle) and passes it the payment code. The destination address oracle may return a destination payment address. The smart contract may use the destination payment address for an on-blockchain transaction.

Having a mathematical guarantee that the crypto assets are coming and going to the same actor crypto address may be useful especially when dealing with KYC and AML regulations. Meanwhile the smart contract (whether its running on some chain or off-chain on a notary server) can maintain a mathematically provable audit trail of its own transactions while still co-existing in a de-centralized ecosystem. This allows for interesting use cases such as an on-chain DeFi smart contract that executes a portion of its code in a certain physical location. In such a case, the notary server would be required to have a 3rd party digitally signed claim from a recognized authority that certified that the notary node is in fact in a certain location. Government financial regulators would be good certification identity signers, for example providing signed claims for citizenship, or signing saying that the servers are located in a building in their physical jurisdiction.

The hybrid crypto system may include an actor crypto address where the actor crypto address includes an identity credential scheme, for example BIP-47 such that additional data (such as certifying a notary node location) is implemented in the hybrid crypto system's identity credential scheme. The system may also attach metadata to that ID in the form of credentials, consisting of claims and claim verifications by various authorities.

In the hybrid crypto system, a pseudonym (or simply "Nym") is a potential identity that has an actor crypto address (i.e. a public address; for example a BIP-47 ID aka a payment code), a corresponding private key, and a set of credentials. A Nym doesn't mean that any real-world information has been authenticated regarding the person represented by the Nym.

Actor Crypto address Wallets (for examples one implementing BIP-47) when they receive an on-blockchain payment they can display the name of the sender. For example, this can be accomplished if using Open Transaction because the Open Transactions API has already downloaded the sender's identity credentials, which are cryptographically verified against the actor crypto address's keys. The display name field is one example of the sort of metadata that can be provided as credentials via as self-signed claim.

An actor crypto address credentials may contain claims about the owner, regarding various facts, relationships, and accomplishments. For example, "My SSN is XXX-XX-XXXX, self-signed, by the actor crypto address private key." Other claims maybe in credentials that are signed by others. For example, a credential may be signed verified claim might look like this, if imagined in human-readable form "The hash fingerprint of an encrypted JPG of my scanned driver's license is 1Jasd876y2jhg34h998, signed by actor crypto address" followed by: "We have officially authenticated this information in person and can reproduce it upon demand, signed by a trusted authority crypto address." The trusted authority may have an actor crypto address or just a private/public key with a published public key.

For example, when meeting someone in person one may add them as a new contact to a smart phone by scanning their QR code, the actor crypto address may be part of a crypto wallet implementation running on a smart phone and may create reciprocal verified claims between both parties smart phones, providing proof to anyone later that they have definitely met each other in real life. Using these verified claims, a "web of trust" can form organically, without any need for "key signing parties." Various trusted authorities may be responsible to identify users and verify claims, as described below. With a claim signed by a trusted authority a user will be able to prove their identity, without having to ask the authentication authority, since the authentication authority already signed the claim, thus claim is a verified claim.

User credentials may also contain blind claims, that is claims that are proven without having to publicly disclose the data behind a claim, but rather the data behind the claim in a 'blind' way. To do this, the value field of the claim is encrypted, and the trusted authority, after assuring the content of the encrypted claim, signs a hash of this blind value instead of signing the plaintext value as might normally occur. The trusted authority may have seen and verified the plaintext value, before signing the claim verification. For example, there may be legal requirements in certain situations to prove a person's age, and so it would be useful for users to be able to prove their age and provide a photo when necessary, without having to post their birthdate or photo publicly for the whole world to see. This is possible using a blind claim. The structure of a blind claim may be the same as for a normal claim, except there is no value field. Instead, the claim includes a blind value field that's encrypted to a (deterministic) key; structured like the Open-Transaction's structure.

Note that the blind value itself is encrypted to a deterministic key which is recoverable from the user's seed. Publicly only the blind hash is visible on the user's credentials, as well as any signed verifications of the claim.

For example, the State of California could sign the hash of an encrypted birthdate in order to allow one to prove their age on demand, when required.

Alternately, a user may be able identify themselves to a notary public, and then the notary may take a picture of the user on the spot and sign the hash of an encrypted JPG of picture. So, when the user is signing documents, not only is the user's signature provably the correct signature from the BIP-47 ID, but a user can also reveal their photo to any challenger while simultaneously proving that an authentication authority, in this example the notary public, has certified the photo (i.e. signed the hash) and thus authenticated it for that same BIP-47 ID.

A notary public—or an on-boarding department—could additionally scan a user driver's license and then sign the hash of a JPG of the user driver license, thus certifying the were presented the driver's license by the person shown on the driver's license.

In this way authenticated data (i.e. verified claims) are made available for a user to prove those claims, as authenticated by a trusted authority, to others, without having to reveal the data publicly, and without having to re-verify their identity over and over again to an on-boarding service. On-boarding processes, exists to verify the identity of a user who are new to a system, for example this may be done over a webcam.

The hybrid crypto system can enable data that is of value when it's been authenticated by an authentication authority. Sherpas may certify that a user climbed Mount Everest. A trusted authority may certify the user as a U.S. citizen. Colleagues may certify they have worked the user.

Other forms of proofs, including zero-knowledge proofs, may be used in user credentials. For example, Zero-Knowledge Succinct Non-Interactive Argument of Knowledge (zk-NSARKS) and Zero-Knowledge Scalable Transparent ARguments of Knowledge (zk-STARKS) may be used for various blind or transparent proofs.

The hybrid crypto system has a cryptographic proof messaging (crypto notary messaging). The cryptographic proof messaging system (aka crypto messaging system) provides off-blockchain transactions secured by cryptographic proofs. The cryptographic proofs can take many forms such as all messages are signed by a private key, and messages may also be signed by a notary private key. An example of a crypto notary messaging system is the Open-Transactions (OT) project. The OT project is a collaborative effort to develop a robust, commercial grade, fully-featured, free-software toolkit that implements off-blockchain transactions purely as cryptographic proofs.

The hybrid crypto system ecosystem may consist of proprietary and open-source software which implements the open source OT protocol.

Open-Transactions (OT) uses strong cryptographic techniques to create secure financial instruments, such as digital signing to create non-repudiable contracts, and homomorphic encryption to create untraceable digital cash. In OT, transactions are unforgeable, receipts are destructible, and balances cannot be falsified or changed without user consent. OT is able to prove all balances, as well as which instruments are valid, and which transactions have closed, without storing a receipt history, as long as one has the last signed receipt.

The cryptographic poof system may implement financial instruments as Ricardian Contracts, which are contracts that can be understood by humans as well as manipulated by software.

All contracts in the cryptographic proof system may use the same basic structure: all parties involved sign an agreement which is notarized by an independent third-party witness (i.e. a notary). This technique is known as Triple-Signed Receipts. Importantly, transactions are formed and signed on the user (i.e. client side) first before being notarized by a notary server. A user (i.e. client) is thus ensured that an notary server cannot falsely create receipts, since the server lacks the user's private key and thus can't forge a signed starting receipt.

A cryptographically provable off-blockchain transaction is a group of operations on contracts capable of objectively proving information, for example balances (and changes of balance) between adversarial parties.

Transactions may use the same basic structure: the private key of a user crypto address signs agreements that are then countersigned by the private keys of a notary server. Transactions are irreversible since the receipts are always formed and signed on the client side first, before being notarized by a notary server. This prevents the notary server from creating a false receipt, since it can't forge the user crypto address signature.

This basic structure may be built upon to create many types of financial instruments, for example transfers, cash, cheque, voucher invoice, market offer, reoccurring payment smart contracts. A transfer is an atomic movement of crypto assets from one account to a different account, like a bank account-to-account transfer. Cash is an untraceable cryptographic token, which can be securely redeemed by the recipient without revealing the sender. A cheque is a payment which is not deducted from the sender's account until the recipient claims it. A voucher is a payment which is deducted from the sender's account at the time of creation. An invoice is a payment request which the recipient can opt to pay from any of his accounts. A market offer is an open agreement to exchange a given quantity of one unit type for a given quantity of another unit type. A recurring Payment is an agreement between two parties that includes an optional initial payment, followed by a set number of additional payments over a specified period of time. A smart contract is a customizable agreement between multiple parties, containing user defined scripted clauses, hooks, and variables.

An example implementation of these financial instruments may be found in Open Transaction, OT.

The crypto notary messaging system may supports DeFi smart contracts which makes it possible for the hybrid crypto system to execute DeFi off-chain where the notary server may set transaction fees. This allows for implementations that provide real time processing and notary server operator controlled transaction fees. One example would be quant trading. Furthermore, the entire smart contract need not be off-chain. With the hybrid crypto system, a wide array of hybrid (i.e. on- and off-chain) functionality is possible.

An actor crypto address may be a user crypto address and the transaction may be an authorization to share medical information. In this use case each medical provider (e.g. hospital) may have a notary node, and a request may originate from a patient crypto address as a cryptographically signed request. For example, hospital 'A' may run a notary node and want to release medical records to Hospital B's crypto address. Once the patient release transaction has been verified and notarized by the Notary node then the medical records may be sent from the crypto address of hospital 'A' to the crypto address of hospital 'B'.

In the hybrid crypto system, each notary server signed receipt contains a copy of the original user-signed request. If the requirements for a valid request also includes an authenticated (i.e. signed) statement of the balance, one can always prove the current balance using the most recent receipt.

The hybrid crypto system may prove which instruments are still valid by including a list of outstanding transaction numbers on each request. The request may also include a list of any incoming transactions where each incoming transaction use a transaction number, in an OT implementation for example an open transaction number.

At all times throughout the process, all parties are able to prove their current balance, as well as which instruments are valid and which transaction numbers are closed, without storing any history except the last signed receipt. Alice's own signature on her request proves these things to Alice, and Bob's own signature on his request proves these things to Bob. The notary server is unable to defraud them.

Users are not forced to keep their receipt history in order to prove the current state. Proofs which require a full history are $O(n)$, whereas the hybrid crypto system's proofs are $O(1)$. $O(1)$ balance proofs are preferable to $O(n)$ proofs, because even though most users would choose to save their transaction history, the risk of a balance proof failing due to data loss does not grow without bound over time like the full history $O(n)$ solution does.

Although a notary server is unable to falsify Alice's cryptographically signed requests, one risk of loss remaining is counterfeiting crypt oassets with a dummy account. A bad actor notary server could try and create a dummy account (with a made-up crypto address) and then sign a false receipt for that dummy account, and thus create counterfeited crypto assets which can then be sent to an accomplice crypto address.

Counterfeiting can be combated by auditing the receipts.

The hybrid crypto system may allow users to deposit their on-blockchain assets (e.g., coins or tokens) into a multi-signature voting pool composed of several notary servers, where each computer server running the notary server software may also run the audit server software, and the pool of servers may vote on-blockchain when necessary to approve withdrawals. This is only possible to do without institutional trust if the off-blockchain system is based on cryptographic proofs, for example Open-Transactions.

The voting pool arrangement has advantages in combatting counterfeiting and theft. Regarding counterfeiting, multiple audit servers, ideally owned and managed by different parties are auditing each notary server, which prevents any one audit server (e.g. a compromised notary server) from counterfeiting transactions on its ledger. Regarding theft, an individual notary server is incapable of stealing coins out of the pool, since a multi-signature vote is necessary to retrieve the crypto assets, and those votes are controlled by the audit servers (aka auditors).

The hybrid crypto system may use voting pools as an open standard with the intent that a voting pool is an arrangement of notary servers and audit servers to securely store and account for customer crypto asset deposits, and to honor valid withdrawal requests even in the event the customer's notary server of choice has completely disappeared. Voting pools are designed to ensure that no single person or organization can perform unilateral actions on deposited crypto assets, this reduces the risk of loss or theft, and custodial liability. Each notary server in the voting pool may operate its own audit server, and each audit server may have a corresponding audit crypto address (e.g. blockchain wallet). The blockchain wallet may manage the multi-signature transaction generation, as well as a hierarchical and deterministic list of addresses for crypto assets (e.g. bitcoins and colored coins).

When a user wants to deposit x units of cryptocurrency into a voting pool, the user may use a user crypto address to send x to the crypto address of the voting pool, which records the corresponding units against the user crypto address account on a notary server. Each audit server watches the receipt stream for requests to deposit or withdraw crypto assets (e.g. bitcoins or colored coins) from the voting pool, and then communicates with the audit crypto address (e.g. a bitcoin wallet) in regards to any on-chain transactions, for example send a signed transaction to the multisig address (pool crypto address) on the blockchain.

Each audit server may independently verify the transaction operations of all notary servers in the voting pool, as well as the crypto currency held by the pool on the blockchain itself. The audit server uses the audit data to know when it should approve the wallet (i.e. multisig pool crypto address) to create a withdrawal transaction, and the audit server is also the component responsible for information sharing and achieving consensus between all members of the pool.

Effectively each audit server conducts a permanent, real time proof-of-reserves audit against of the notary servers in the pool, and simultaneously enforces it by only signing off on the transaction when the transaction passes audit. If the transaction passes then the audit sever may send the signature for the multisig. It is the audit server and the pool crypto address (e.g wallets) who hold the keys to creating blockchain transactions at the request of the user through the notary server. The audit servers must act by consensus and through the pool audit address (e.g. the wallet) to authorize the multi-signature blockchain transaction.

Each voting pool—regardless of how many notary servers (aka notaries)—may still be implemented as a single notary node with its own actor crypto address (e.g. BIP-47 payment code), aka an pool crypto address, or off-chain crypto address, that supports on-chain mulitsig.

In order to achieve security and robustness for voting pools, the following criteria are enforced, avoid bitcoin address re-use. The hybrid crypto system may discourage user from reusing deposit addresses. The voting pool itself may never reuse a bitcoin address. Each notary node of the pool may calculate all of the series of deposits and changes to an account. Withdrawal transaction input selection should be deterministic in order to minimize the cost of coordinating transaction signing.

The hybrid crypto system may keep a majority of the private keys offline for security reasons and bring them online as needed to process withdrawals.

The hybrid crypto system may alter the voting pool by adding, removing, or replacing members in a coordinated and secure fashion. It is necessary to use Smart Properties to accomplish this.

These are described in the below in the discussion on colored coins.

If the probability of m+1 (Type 1 Event) or n m+1 (Type 2 Event) services simultaneously and identically behaving in a malicious or incompetent manner is lower than the probability of any individual server behaving in a malicious or incompetent manner, user deposits on that service are at less risk of loss if the service is a member of an m-of-n voting pool than they would be at risk if the service is not a member of a voting pool.

Voting pools can guarantee the integrity of user deposits if, in any given situation, at least m pool members are well-behaving for Type 1 events and at least n m pool members are well-behaving for Type 2 events.

The audit server listens to the audit streams broadcast by all the notary servers and independently verifies them for correctness. The same stream which carries regular transaction (e.g. OT transaction information) may also contain the OT receipts for Bitcoin withdrawal requests from the pool. The audit server initiates or authorizes a blockchain withdrawal transaction via the wallet if and only if the audit for that service is clean (verified correct).

The auditor is responsible for maintaining an independent copy of the same deposit database as the notary server. the audit server also tracks withdrawals from the time at which notary server receives a transaction (e.g. an OT receipt), containing a withdrawal request, until the corresponding Bitcoin transaction is fully confirmed on the blockchain.

All messages which must travel between the notary server and the blockchain wallet pass through the audit server.

In order to create withdrawal transaction, wallets must be able to select inputs and change outputs, and calculate the minimum required transaction fee deterministically. In order to achieve determinism, the sequence of withdrawals must be globally consistent. Before sending any withdrawal request to the wallet, the auditors are responsible for achieving consensus on a serialization order for withdrawals.

The notary server keeps track of all distributed-ledger-denominated balances via signed notarized receipts, for example OT receipts. In addition to the separate account(s) for each user, the server may have a notary crypto address (aka a service account) to hold the distributed-ledger-denominated balances managed by the notary server itself.

If necessary, the server should also maintain an application account to hold the balance of any funds which are being manipulated by an external system.

For example, in the case of a high-frequency exchange, the application account would belong to the order matching engine. When a user enters a trade, the exchange front-end will send the applicable crypto notary messaging (e.g. call the applicable OT functions) to transfer the appropriate balance from the selling crypto address (e.g. OT account) to the notary crypto address (e.g. application OT account) and also from the application account back to the appropriate purchasing customer's OT account. Any trade fees that the exchange earns would be sent to the service account as part of the transaction. The separation of application account, service account, and customer account, prevents the mingling of crypto assets.

The notary server may also be responsible for passing PaymentRequests from the Auditor to the user, crediting user balances after the successful receipt of a blockchain deposit, and passing withdrawal requests to the rest of the voting pool via the audit servers.

The notary server must maintain a permanent deposit database containing each PaymentRequest generated for that server and its associated status (number of blockchain confirmations and the OT receipt crediting the appropriate Nym with the deposit)

The notary server may broadcast five types of messages in an indexed and hash-chained sequence which form an Audit Stream.

The five types of messages are, 1) an update to an inbox, 2) an update to an outbox, 3) an update to an account balance file, 4) an update to a Nym box file, 5) notary server replies to transaction requests.

In order for users to deposit cryptocurrency into the voting pool, the OT Client may be capable of parsing, verifying, and if necessary, forwarding to another blockchain wallet client, payment requests. This is necessary to ensure a malicious notary server cannot send a fake deposit request that results in a customer sending crypto assets to an address not controlled by the pool.

Users of services which are part of a voting pool may have an OT client running on their device in order to use the service. The service front end can communicate transparently with the OT Client via a local websocket interface.

The OT client will be capable of operating in the background with the bare minimum necessary interaction in order to provide the lowest possible disturbance of the front end service's user experience (UX).

Each server in the pool requires an offline, air-gapped machine for key generation called a key server. It is equipped with either a dedicated, non-networked printer, or else a CDR drive. No media of any kind is ever allowed to cross the air gap in the online→offline direction.

The key server generates random BIP32 seeds in batches (default: 52, or enough for one year).

When a batch is created, it prints the xpubs (extended public keys) for all 52 seeds on paper as QR codes (alternately on a virgin CDR which is discarded after a single use). This paper is then manually walked to the auditing server and scanned. The auditing server adds each xpub to the keyset definition.

At the same time, the key server also prints two redundant copies of the QR codes containing the xprivs (extended private keys), one per page (one per CD) which the service should hold in some physically secure fashion and back up securely. It is not necessary for all individual services to take extraordinary measures to protect the private keys from physical destruction, since the pool can tolerate a loss of keys that involves less than (n-m) members. One copy held in an offsite location with another copy held on site is sufficient.

Xprivs are loaded into the auditing server in series number order to create the hot series. Each participant in the pool should have a method of being notified when the hot series is close to being exhausted so that an employee can be instructed to load the next xpriv into the auditing server.

New key batches should be generated early before the old batch is consumed (default: 75 percent used). If for any reason one of the participants is late and does not generate a new batch on time, the last defined series number is used for accepting deposits until the administrators of the other pool members can correct the situation.

The key server must also be equipped with a scanner. Prior to putting any keys into service, they must be validated.

Validation procedure: The key server will create the first one million public and private keypairs from each seed in the batch, sign a nonce with each private key and verify the signature with the corresponding public key.

Then the user will scan in the printed public and private keys, and the key server will verify the scanned versions match the original versions and repeat the million keypair test.

Both versions of the test must match identically before placing any of the keys into service.

Every pool represents a compromise between performance and cost. For security and reliability purposes, higher reliability levels are better, however they must be balanced against the cost factor. Standard pool sizes are the lowest cost pools that produce a given reliability level.

Customers will normally request a deposit address by interacting with the service front end web site or some other software application. When the service receives such a request, it notifies the OT client via the OT client API function: requestBailment.

When the OT client receives notice of a user desire to deposit crypto assets to a voting pool, via any method, it sends a bailment transaction request to the notary server to initiate the deposit process.

The notary server validates this request, and replies with a signed receipt. A copy of this receipt is broadcasted to the audit stream, and another copy is stored inside an initiatedBailment notice that's placed in the user's inbox. The notary server adds this association to a bailment database for future reference.

When an audit server validates the notary server's reply to the bailment message from the notary server to which it is assigned, the audit server adds the receipt identifier to its bailment database and calls getDepositScript via the websocket interface to the blockchain wallet, using the address identifier for the next unused deposit address.

The wallet calculates and returns the designated deposit address as P2SH output script. The audit server uses this information to update the bailment database, and to assemble and sign a PaymentRequest.

The audit server broadcasts the PaymentRequest to all notaries and auditors in the pool. The notary server replaces the user's initiatedBailment notice in the inbox with a pendingBailment notice containing a copy of the PaymentRequest.

When the other audit servers in the pool receive the PaymentRequest broadcast they add the deposit to their respective bailment databases. The other notaries in the pool cache the PaymentRequest to answer verification requests from the OT client.

The OT client should validate the PaymentRequest against the voting pool asset contract. If it is valid then it should query a random selection of other notaries, at least m 1, using the PaymentRequest identifier to verify whether they have seen it. If this check is successful, it then initiates the blockchain transaction by passing the PaymentRequest to the user's local wallet application which is configured to handle bitcoin: URIs.

The audit server broadcasts the PaymentRequest to all notary servers and audit server in the pool. The notary server replaces the user's initiatedBailment notice in the inbox with a pendingBailment notice containing a copy of the PaymentRequest.

When the other audit servers in the pool receive the PaymentRequest broadcast they add the deposit to their respective bailment databases. The other notaries in the pool cache the PaymentRequest to answer verification requests from the OT client.

The OT client should validate the PaymentRequest against the voting pool asset contract. If it is valid then it should query a random selection of other notaries, at least m 1, using the PaymentRequest identifier to verify whether they have seen it. If this check is successful, it then initiates the blockchain transaction by passing the PaymentRequest to the user's local wallet application which is configured to handle bitcoin: URIs.

Type 1 Event: Fraudulent Deposit Address. A malicious or hacked operator may give the customer an invalid PaymentRequest in an attempt to steal deposits.

Each pool member's Bitcoin wallet must notify its audit server of any deposits received to an address which the pool controls. When an incoming transaction is received to an address the audit servers are expecting due to previously broadcast PaymentRequest, they will use the getinfomultisigwalletaddress calls to identify the incoming transaction, and gettransactionstatus to monitor its confirmation status.

Type 0 Event: Deposit Never Received. It's possible that the customer may never actually transfer bitcoins after requesting a PaymentRequest.

Type 1 Event: Unknown Deposit. A deposit may be received to an address which has never been used, and for which a PaymentRequest was never created so no member of the pool knows to which nym it should be credited.

Type 1 Event: Duplicate Deposit. A deposit may be received from an address which has been previously used, so the audit servers know to which nym the address is assigned.

Type 0 Event: Dust Handling. The size of the deposit may be below the network dust threshold (small enough that it would require more in transaction fees to spend than it is worth).

The audit server relays the number of confirmations the incoming transaction has received to the notary server. Once the number is sufficient according to the Funds Available Policy the notary server will issue an OT asset for the amount of the deposit to the nym of the user.

The notary server will replace the pendingBailment notice (in the inbox) with a completedBailment notice, which includes a signed copy of the original bailment request, as well as a copy of the audit server's signed notice of confirmations, which includes the transaction identifier provided by the blockchain wallet.

The OT client processes the user's OT account inbox, removing the completedBailment notice, which simultaneously closes the transaction number and updates his OT balance.

The audit servers in the pool must monitor all deposits to ensure the Funds Available Policy is satisfied to avoid the risk of a double spend or chain fork causing insolvency. Any server which offers more early deposit credits than what it can cover with its service account must have its audit status set to degraded.

Type 2 Event: Non-credited Deposit. The notary server fails to place a completedBailment notice in the user's inbox after a successful Bitcoin transfer.

If an initially-seen deposit fails due to a chain fork, and if the user has not yet been credited with an OT receipt for the deposit, the status of the deposit remains pending. The audit server should notify the notary server by setting the number of confirmations back to zero. In the typical case of blockchain reorg event, the deposit transaction should re-enter the mempool automatically and the wallet can assist with this by rebroadcasting it.

If an initially-seen deposit has become invalid due to conflicting transactions which made it into the blockchain, the audit server should mark the deposit as failed by setting the number of confirmations to −1. The audit server should notify the notary server of the failure, who then replaces the user's pendingBailment notice with a failedBailment notice. The notary server should update the status to failed in the bailment database and the address should not be intentionally reused. The OT client can then process the user's inbox, removing the failedBailment notice and closing the transaction number. In this case there is no change to the OT account balance, unlike with a completeBailment notice.

Type 1 Event: Reversed Deposit. A deposit could disappear from the blockchain after the user has already been issued an OT receipt Customers will normally request a withdrawal of bitcoins from the pool by interacting with the service front end web site or some other software application. When the service receives such a request, it notifies the OT client via the OT client API function: outBailment.

When the OT client receives notice of a user desire to withdraw crypto assets from a voting pool, via any method, it sends an outBailment transaction request to the notary server containing the destination Bitcoin address where the withdrawal should be sent, the amount of the withdrawal, and an extraFee value. The extraFee is added to the transaction fee required by the Bitcoin network and is paid directly from the user's balance and may be zero.

Note: Some customers may wish to have additional restrictions placed on withdrawals, for example to prevent withdrawals to arbitrary Bitcoin addresses, or to require two-factor confirmation of withdrawals, or time delays to allow for notification and manual review of withdrawal requests. All this functionality and more can be provided by users electing to store their deposits in an OT smart contract instead of a standard receipt.

After the notary server receives the outBailment transaction request, it removes the total amount from the user's balance and places it in the outbox as a pendingBailout receipt.

Type 2 Event: Withdrawal blocking. The notary server handling a customer account may fail to respond to a valid withdrawal request.

When the audit server sees the pendingBailout receipt, they create an entry in their withdrawal database and add the pendingBailout to their queue for the next consensus.

Each time a new consensus is finalized, the auditors begin processing the specified pendingBailouts (if any) by passing the address identifier of the first input to be used, the address identifier of the first change address to be used, and the withdrawal identifier of each output to the Bitcoin wallet via the startwithdrawal API call.

The startwithdrawal API call accepts a list of outBailments to process, and the set of parameters which are needed to ensure the transaction process is deterministic.

When the wallet receives this call, it processes the list and parameters per the transaction construction algorithm and returns a list of signatures and status information for each outBailment.

If the wallet requires the private keys from additional series in order to fulfill the outBailments, that information will be returned with the status information.

The auditor server takes the signature list from the wallet and broadcasts it to the rest of the audit servers. It also collects signature lists from the other audit servers and queues them for delivery to the wallet.

Before the auditor can provide the missing signatures to the wallet, it must ensure the transaction fee has been properly accounted for. While the auditor is broadcasting and gathering signatures, it also sends a txFeeNoticemessage to each notary server from which a withdrawal has been processed, indicating their share of the blockchain transaction fees included in that consensus round.

Blockchain transaction fees may be allocated to a specific server by the fraction of total withdrawals in the round which originated from that server. The method of calculating the individual shares should ensure the individual totals add up exactly to the blockchain transaction fees consumed by the transaction.

When the notary server receives at least m identical txFeeNotice messages, it then performs a balance adjustment by subtracting the amount from its service account for the pool, and adding that amount to the issuer account for the pool. The auditor cannot release the rest of the signatures to the blockchain wallet until it validates the appropriate balanceAdjustment notice in the audit stream.

Type 0 Event: Transaction Fees Accounting. The originating notary server may fail to deduct blockchain transaction fees from its service account and broadcast this receipt in the audit stream.

When the auditor validates all needed balanceAdjustment notices, it delivers the signature lists to the wallet via the updatewithdrawal API call. The blockchain wallet then adds signatures to the transaction(s) until it has m, then it broadcasts the transaction(s) to the network. It is not necessary for each wallet in the pool to include the same list of signatures in the transactions they broadcast. As long as all the transactions are valid, the network should accept one version and include it into a block.

Type 2 Event: Transaction Signature Error. All or a portion of the signatures a wallet receives from the other pool members may be invalid for the given transaction.

The start withdrawal API call returns a list of one or more normalized transaction identifiers (ntxid), where each ntxid is linked to a list of the withdrawal identifiers corresponding to the outputs in the transaction. The audit server updates its withdrawal database with the ntxids, and begins tracking the confirmation status of the withdrawal. It reports all this data to the notary server, and each new confirmation of the transaction.

Like deposits, withdrawal transactions are not considered final until maturationTime confirmations have occurred. Once the auditor reports a number of confirmations greater than or equal to maturationTime for the blockchain transaction associated with a pendingBailout receipt, the notary server replaces that receipt with a completedBailout receipt. When the auditors see the completedBailout receipt in the audit stream they can prune the associated entry from their withdrawal database and stop sending confirmation updates.

Type 2 Event: Failed Withdrawal Transaction. The Bitcoin network may fail to confirm any version of the withdrawal transaction.

Various techniques make it possible to issue new units onto an existing blockchain. For example, ERC-20 on the Ethereum blockchain, and Simple Ledger Protocol on the Bitcoin Cash blockchain. These tokens can be stored and transacted using wallet software, as well as deposited onto servers for off-blockchain transactions such as exchange. The following is a brief introduction to the concepts and techniques involved.

The Hybrid Crypto System ecosystem allows anyone worldwide to download our Node software and operate distributed finance applications including issuance and processing of their own token or existing tokens.

The term "colored coins" may be created by two different mechanisms, either transactions or attributes. The transactional approach is a technique for carefully constructing blockchain transactions in a way that preserves information apart from the base monetary value of the underlying coin. The attribute technique the extra information is preserved in the blockchain by employing the colored coin technique.

In this document the term virtual tokens refers to the extra information that is preserved using a colored coin technique.

Virtual tokens possess all the capabilities of currency, plus one additional capability (smart property) which is helpful for non-currency usage. Actor crypto address may use virtual tokens to, transfer, combine, divide, for smart contracts, in a multisig, prove its validity. Transfer them between individuals. Combine multiple tokens into a single token with a greater value. Divide the value of a single token into multiple tokens. Use them in blockchain-scripted contracts. Store them on the blockchain with multisig scripts. Unambiguously prove that any particular virtual token is a valid member of a set created by the issuer, without requiring the issuer to create and manage a token registry.

Virtual tokens may represent ownership information, but they can't enforce real-world obligations. For example, a particular issuance of virtual tokens might represent tickets for entry to a concert. The virtual token can prove the bearer should be allowed to enter the concert, but it can't force the bouncer to step aside and let him pass. Colored coin techniques can't prevent the user from manipulating the underlying bitcoins in a way that destroys the extra information, because operations on virtual tokens are governed by Bitcoin transaction rules, and colored coin requirements are stricter but not enforced by the blockchain network. Using virtual tokens in a transaction that does not obey the colored coin rules destroys their extra meaning, leaving behind only their base monetary value. This is equivalent to taking one's paper concert ticket and setting it on fire.

The quantity and ownership of virtual tokens can be stored in the blockchain, but the semantic information that indicates what a token means is not (and cannot be) similarly stored. For example, the blockchain will track how many concert tickets have been issued and which address owns them, but not the fact that they represent authorized entry into a particular concert at a specific time and place. The storage of and operations on metadata require a specific kind of external system, like a crypto notary messaging such as Open-Transactions.

The speed of colored coin transactions, and the capabilities of scripted contracts that use virtual tokens are the same as those of the underlying blockchain.

There are two techniques that may be used to create virtual tokens: transaction-based coloring and address-based coloring.

Transaction-based coloring was pioneered by ChromaWallet and works by identifying a specific Bitcoin transaction at a particular time as the "genesis transaction" and tracking all units which descend from the genesis transaction. Transaction-based coloring can produce the full range of virtual token types and has the security property that even a loss of the original private keys to the genesis address cannot result in the issuing of counterfeit virtual tokens. This security property means the number of virtual tokens matching a color definition is fixed at the time of creation and cannot be altered in the future-which can be an advantage or a disadvantage, depending on the application.

Address-based coloring, for example as first done bone by Coinprism, tracks bitcoins which are descended from any transaction that passes through a defined address. This means the issuer can easily create new units in the future, but so could a thief who manages to steal the private key for that address.

The different use cases for virtual tokens can be divided into three general categories, Ticket, Certificates and.

Tickets are transferable bearer tokens which are designed to be eventually redeemed for some kind of real-world value.

Examples of tickets include:

Event entry passes, store coupons, special offers, frequent flyer miles and other redeemable rewards, or anything that needs a limited precise or predetermined number of unique identifiers (i.e. tickets)

Both address-based and transaction-based coloring can be used to create tickets.

Certificates are transferable and redeemable in the same manner as tickets, and they additionally entitle the bearer to some kind of revenue paid through the blockchain.

Certificates can be used for bearer securities, such as securitized loans, mortgages, bonds, and dividend-paying stocks.

Both address-based and transaction-based coloring can be used to create certificates.

Smart properties are transferable like tickets and certificates, and in addition, every particular smart property is both unique and atomic. Only one smart property of a given identifier can be created, and once created it may not be subdivided.

Smart properties can be used to indicate ownership of a unique real-world asset, and can also be used for objective naming of content-addressed mutable data. This naming function is related to, and an extension of, hash-based naming.

A common operation in software engineering is to use cryptographic hash functions to create short identifiers for large pieces of data. This is useful because hash values are easy to communicate since they are short, and also are easy to check since they are deterministic. This means if you know the name of some piece of data, you can independently verify that you have the correct copy of it. But the limitation of hash-based naming is that the named data can never change.

Smart property overcomes this limitation. Because of a Bitcoin feature (OP RETURN) that allows arbitrary data to be attached to transactions, every time smart property is moved it can be associated with a new hash. This means if data is identified by a smart property identifier instead of using the hash, the identifier of the smart property can objectively and unambiguously identify the most current version of the data.

The Hybrid Crypto System may be implemented in part on a smart contract running on a distributed leger, for example on a Turing complete blockchain like Ethereum. The Turing complete smart contract (converter smart contract) may implement the converter, also known as the "MatterConverter", that allow actor crypto address to stake crypto assets (place the crypto asset in the converter smart contract) in order to earn accrued interest in return for supplying market liquidity. User may be borrowers that can obtain loans from the staked assets but the borrower may have to provide collateral denominated in other asset types. The acceptable collateral may be set by the hybrid crypto system, for example a list of acceptable distributed-ledger-denominated coins.

The hybrid crypto system may be powered by a utility and governance token, the "MatterToken," (this may be similar to the functionality found in Compound's 'Compound token').

The converter smart contract may also issue "mTokens" to actor crypto address who stake crypto assets. The mTokens come in various types, corresponding to their underlying "staked" coin. The mToken has the syntax of m<Tokens>, where <Token> is some type of coin, for example for Ether (ETH) in which case the mToken would be of the form mEther (mETH), Bitcoin (BTC) would be called mBitcoin (mBTC). The mTokens may be redeemable at any time for the underlying asset, and until that redemption occurs, the mTokens may accrue interest. For example if a user stakes some amount of ETH, the converter smart contract receives that ETH and in return, sends the user an equivalent number of mETH tokens, which are redeemable back anytime for actual ETH. mTokens are redeemable at an exchange rate (relative to the underlying asset) that constantly increase over time, based on the rate of interest earned by the underlying asset. For example, the amount of ETH that can be exchanged for mETH increases with every Ethereum block that is created.

User crypto address that either stake or borrow coin not only may earn interest on their staked coin, they may also get rewards in the form of bonus UGToken, (Utility and Governance Tokens) at launch. UGTokens may be used for governance of the converter smart contract. This may include voting on proposed changes to the protocol that the contracts in the converter smart contract implement.

The crypto hybrid system may allow mTokens to be posted as collateral via locking in order to borrow real crypto assets like ERC-20 tokens. When mTokens are locked the corresponding underlying asset isn't redeemable until the loan is paid off. To borrow a user crypto address must stake the collateral first. In the case of borrowing, the amount that a user crypto address must repaid may increases over time as interest accrues.

If the borrower crypto address fails to pay off a loan, then other user crypto addresses (i.e. liquidator crypto addresses) may be incentivized to pay off portions that the borrower crypto address owes, in return for an percentage of the borrower crypto address loan's collateral. For example, if the liquidation incentive is 1.2, the converter smart contract may pay the liquidators crypto addresses an extra 20% of the borrower crypto address loan's collateral for every unit of debt that has not been paid according to the loan's schedule.

Notary servers can operate faster, more efficiently, and more powerful transactions. A user crypto address may deposit coins and tokens into a notary server where off-blockchain transactions are secured with cryptographic proofs. User crypto addresses may be able access a variety of off-chain cryptographically secure instruments. For example, the instruments may be digital cash, digital cheques, invoices, recurring payments, exchange, DeFi smart contracts or other types of instruments that crypto currency or cryptographic security may be useful for.

Notary servers may be organized into a notary pool. A notary pool may have signatures for a blockchain-based multisig address. The multisig allows for more security for the storage and movement of deposited crypto assets so the custodied crypto assets are safer from theft and fraud. A notary server may have an associated actor crypto address (e.g. like BIP 47) called a notary crypto address, aka notary ID, or operator notary ID.

The converter smart contract may send to the notary crypto address UGTokens for various reasons. For example, the UGTokens may be for operating the notary server. The UGTokens may be sent when the notary server meets certain operating criteria, for example being available to process transactions, operating the notary server at or above a specified rate, or notarizing a certain number of transactions, or when the average time for a transaction to be notarized is bellow a desired transaction time, or other performance metrics.

A notary server may calculate a transaction fee for handling a transaction. Notary servers may earn transaction fees for processing off-blockchain transactions. At the point of each transaction, the transaction fee may immediately be sold for utility and governance Tokens (UGTokens). A percentage of the purchased UGToken may be allocated to the converter crypto address. The percentage to be paid may be stored in the notary servers account (example an OT account).

If a notary node is charging 0% (Zero) transaction fees, then the notary node may get to use the hybrid crypto system for free. If the notary server charges a transaction fee then a portion of the transaction fee may get allocated to the converter crypto address, this may be for providing the hybrid crypto system software, or access to the converter smart contract.

Notary server's notary crypto address may receive staking rewards (coins or tokens) from the converter smart contract at a staking rate. The staking rate (aka staking reward rate) may be stored in the hybrid crypto system, for example in the converter smart contract. The staking rewards rate may be increased when certain conditions or behaviors are met. Notary crypto address on a notary node may be able to enter into a staking contract with the converter smart contract, by calling the smart contract API to establish a staking contract. The staking that's managed for a user crypto address by the notary server. The notary server may therefore, send to a user crypto address mTokens. The user crypto address may then use the mTokens off-chain on the notary servers.

Notary server operators may get to borrow from the converter smart contract at a notary rate (aka an operator interest rate). The operators interest rate (i.e. a notary crypto address's interest rate) may be less than a borrow interest rate (i.e. interest charged to a borrower crypto address). The operator interest rate and the borrower interest rate may be controlled by governance.

Controlled by governance means a process that uses the UGToken to enact a change in the program. For example the interest rate (either the operator interest rate or borrow interest rate) may be stored in the converter smart contract, and the converter smart contract may have code that receives a new value for the interest rate and if enough UGTokens vote to approve the change then the new value will replace the old value. This approval process may happen all on-chain, or a combination of on-chain and off-chain.

User crypto address identity protocol may enable on-blockchain DeFi contracts (and notary pools) to perform KYC and AML processes when appropriate. The hybrid crypto system may be used to create financial instruments for user crypto address that meet certain KYC-AML criteria. For example, the on-chain or off-chain contract may only accept user crypto address associated to identities of users that are residents of the USA. Another hybrid crypto system contract may only accept transactions form user crypto address associate to residents of Japan. In another use case a notary server may only be able run code if the notary crypto address has been certified as being in a certain geography. So a notary server may be able to process Japanese yen only if the notary crypto address indicates it is located in japan, the system may require that location information to be digitally signed, the system may require the location to be digitally signed by an authorized crypto address (e.g. a private key owned by the Japanese government).

The converter smart contract may have capabilities controlled by governance.

The user crypto address with share secret key (e.g. BIP-47 payment code) powered mToken issuance. An actor crypto address (e.g. BIP-47) enabled smart contract may know a verified identity that sent corresponding mTokens to when the contract receives a stake. The smart contract may not need to accept a staker's receiving address. With the actor crypto address having the ability to generate a shared secret this can serve to inhibit the ability to use the converter smart contract for money laundering. With user crypto address with shared secret key (like BIP-47) the user is always treated as a single atomic entity by the converter smart contract as opposed to making the assumption that the user will provide a receiving address that is theirs. So, with staked tokens received from a user crypto address with share secret key when it is time to return the staked tokens, the hybrid crypto system may automatically send the tokens back to the user crypto address that stakes the tokens.

The user crypto address with share secret key ability (for example BIP-47) may use side channel communication that uses the shared secret key in determining a message destination for communicating, for example using a transform like a hash of the shared secret key, or using an side channel communication for example BitMessage. The generated shared secret may be used to help derive secure encrypted communication between the user crypto address and the program crypto address (e.g. notary server crypto address). The derived secure encrypted communication may include using the shared secret key to derive a communication address. For example, the smart contract may call an API on a BitMessage server and then a BitMessage network may deliver the message to the actor crypto address (e.g. audit server crypto address). Instructions supported by the smart contract may be sent via the side channel communication. For example, the converter smart contract may accept instructions such as BORROW causing a specific stake token (e.g. mTokens) to be locked. Furthermore, this side channel communication may be used to support additional features and functions, for example validation or approval of transactions (for example before the transaction is executed on-chain or off-chain), submitting offers for lending or staking crypto assets, and any capability or communication that would be improved, make simpler, make more secured or less traceable.

Parts of the hybrid system that need to run in a specific jurisdiction can be enforced at runtime in the off-chain server. the hybrid system may check that a notary server has an actor crypto address has a validated claim about running in a particular country or state. For example, it may be best legally that issuance of new crypto tokens be only done in a particular country or State, for example Wyoming where the laws are clearer. Then the hybrid crypto system would ensure the notary crypto address has a claim of being located in Wyoming. The claim of being located in Wyoming may be validated by an authorized crypto address, for example one controlled by the state of Wyoming.

BIP-47 enabled KYC/AML using signed claims. The converter smart contract may be programmed to only accept crypto assets according to jurisdictional rules. For example, a certain currency could be only available to user crypto addresses (like BIP-47 identities) that have been KYC/AML'd and have signed claim to that effect from a specific actor crypto address. For example, if a contract receives crypto assets but the actor crypto address fails to have the required KYC/AML claim that is signed then the hybrid crypto system may automatically refund the transaction.

The user crypto address with shared secret key ability (e.g. BIP-47) may help provide smart contract auditability. Although 3rd parties can't divine anything meaningful about transactions between any specific user and the smart contract, the user and the smart contract can see the transactions between themselves when they use BIP-47 as they know their own and the other parties receiving addresses. Thus, the hybrid crypto system (either in the converter smart contract or on a notary server) can maintain a log of transactions for some, all or none of its transactions that are tied to a user crypto address. This can be particularly useful to meet KYC/AML'd requirements for a particular jurisdiction. Standards and this information can be verified by inspecting the blockchain for the list of transactions associated to a particular user crypto address.

FIG. 1 provides an overview 100 of the actors (Stakers and Borrowers) & (Staker & Borrower Nodes) with Matter Converter.

The notary servers acting as staking notes may send coin or token (e.g. Etherium or wrapped Bitcoin, WBTC) to the converter smart contract, and in return the converter smart contract may send mTokens (e.g. mWBTC) and UGTokens to the notary crypto address.

The converter smart contract may be one program (one smart contract) or multiple programs (smart contracts). The converter smart contract may be configured in any number of ways.

UGToken may be differentiated from other tokens in the utility it offers by allowing users to gain access to a hybridized crypto financial (hybrid crypto system) where on-blockchain deposits may be stored securely while off-chain instruments can make transactions faster, cheaper, and more powerful. The 'actor crypto address' identity protocol may allow the converter smart contract's liquidity reward system to interact with other on-chain decentralized-finance contracts and with notary servers, actor crypto address or off-chain oracles to provide approval to any requirements for a transaction. For example, the converter smart contract may call out to a smart contract oracle that can approve the transaction if the actor crypto address can provide singed claim they are a citizen of the united states, or are not an a Anti Money Laundering watch list. So, the smart contract may only proceed with the on-chain transaction if the a user crypto address has been KYC-AML approved. A hybrid crypto system may allow an off-chain contract to operate differently for residents or citizens of the US than one for residents or citizens of Japan. Thus, the hybrid crypto system may provide a geographical fencing feature, enforce citizenship requirement, or do specific handling for certain citizenships.

The hybrid crypto system may have user crypto address with ability to create shared secret key generation (e.g. BIP-47), identity credentials, side chain communication, token issuance and voting pools represents a complete solution for the issuance, storage, and transaction processing of blockchain-based assets, creating interesting use cases across a myriad of industries.

Retail Banking. Users can deposit cryptocurrencies in financial institutions (or federated collectives of financial institutions) operating pools. These "off chain" deposits are protected by the pool but don't require mining and process with speeds comparable to regular financial transactions. For example, a user could transact cryptocurrencies or even, a bank issued stable coin fiat equivalent.

Exchanges, Investment, Trading Fintech. Voting pools are the currently most secure model for operating an exchange that can trade any asset. Furthermore, the identity credentials afforded by BIP-47 allow money transmitters to KYC/AML their users and have cryptographic proof that they are sending and receiving crypto assets from identities they verified. This solves big problems in meeting compliance for centrally regulated businesses in a global decentralized ecosystem.

Token Offerings. Hybrid Crypto System's Colored Coin implementation facilitates easy issuance and liquidity of any type of token, be it a security, asset, or "coin." Token issuers with the hybrid crypto system can make cross-chain moving of tokens possible. For example, start off on Ethereum with ERC-20 tokens and move them to the Bitcoin Cash blockchain at the user's request. Tokens on disparate blockchains can also be deposited into a single OT notary server and traded against each other.

Gaming/Social Media. Presently these ecosystems usually employ their own in-house financial transaction systems that aren't globally liquid. If they use cryptocurrencies for payment the traditional solutions pose money laundering challenges as game operators find themselves unwilling middlemen for illicit transactions. Hybrid Crypto System's identity scheme makes it easy for game companies to digitally meet the same financial requirements as traditional fintech's while maintaining their business model.

The hybrid crypto system may be used in the medical industry.

A user crypto address may have claims regarding demographics (name address phone number), insurance coverage and medical conditions. How the money (e.g. stable coin, token or other payment) gets allocated once it is received by the medical organization (hospital, doctor, or insurance company) could all be accounted for. The actor crypto addresses could assure secure private communication (for example between an insurance crypto address and a patient crypto address) inside the hospital or insurance company.

The hybrid crypto system may be used for processing identity blinded medical records. For example, a medical test results may be stored or indexed on a medical blockchain. For example, the medical records may include x-rays, blood test results, blood pressure, MRI. The medical records can be published on chain with no Personally Identifiable information (PII) and signed by a medical record authority.

Then the notary nodes can be used off chain to perform statistical analysis on the blinded records. The identification and demographics (name address, phone number insurance information) may be stored as blind claims, and validated (e.g. claims signed by an authority, such as a certified hospital intake department). This may be used by the medical community to analyze a patient geographic region (without revealing their address) The identity blinded records could be test results certified by the originating lab or hospital. The validation on a blinded data (via a signed claim) maybe done by the private key of an industry organization, for example AMA (American Medical Association) or ADA (American Dental Association).

If later there is new research in which a certain set of test result or conditions now has a new treatment, then the block chain can be used to find test results that fit the profile, and the test data provider may communicate through the shared secret key generation provider to those who should be notified.

Figure 2:
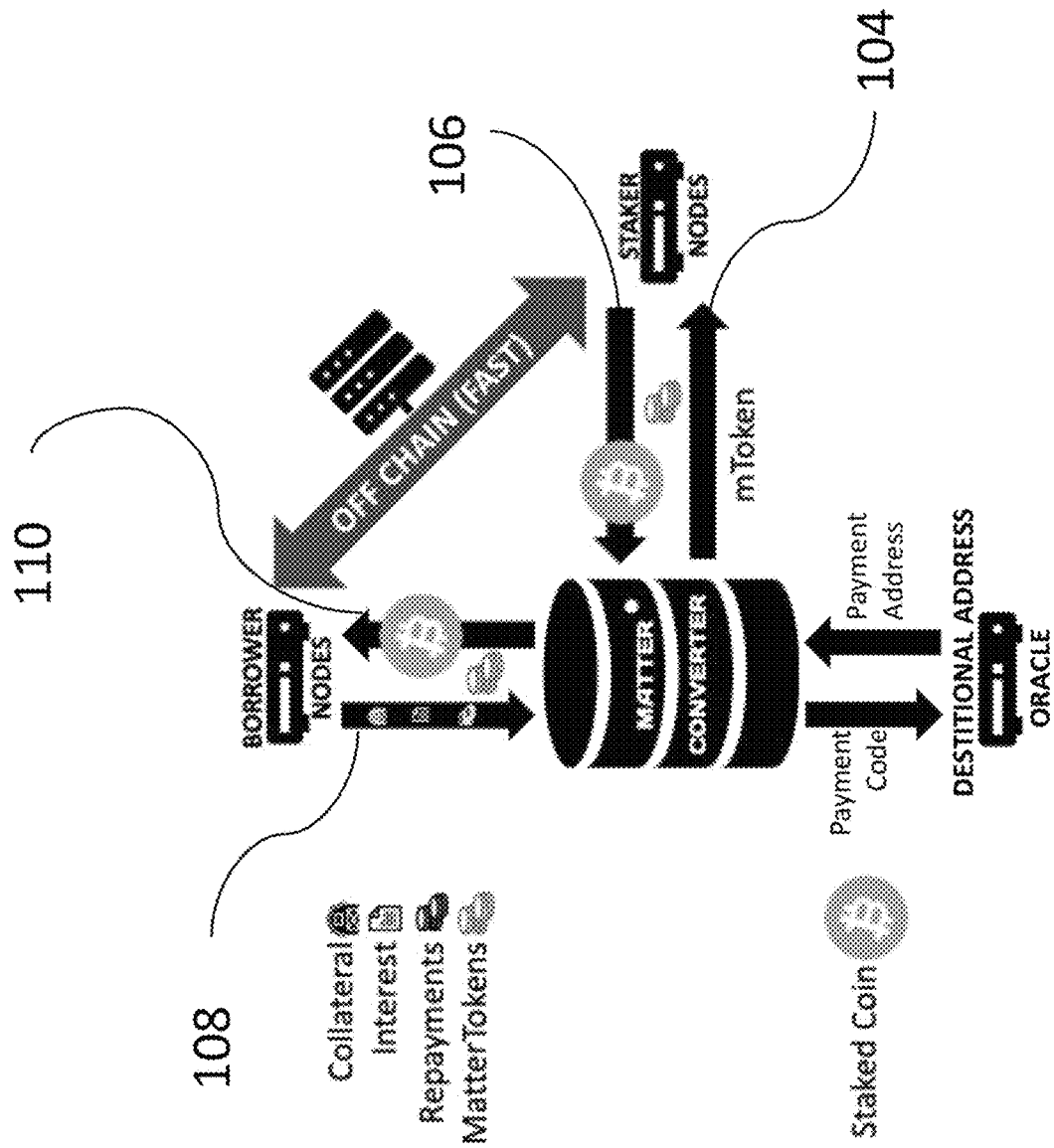
FIG. 2 Illustrates a block diagram showing Staker and Borrower nodes interacting with a blockchain Oracle.

FIG. 2 Illustrates a block diagram showing Staker and Borrower nodes interacting with a blockchain Oracle.

Figure 3:
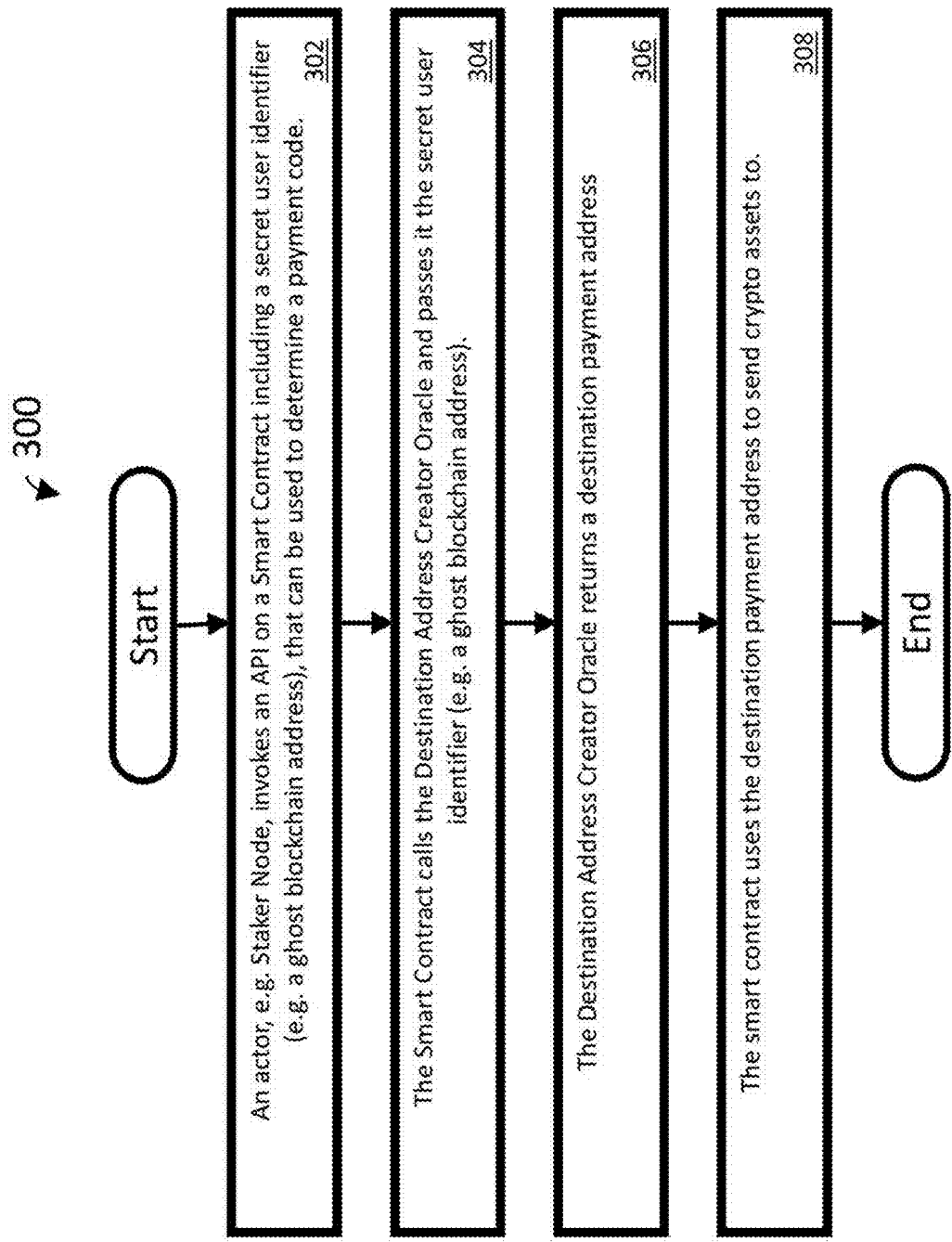
FIG. 3 illustrates a flowchart showing sending a crypto asset using a secret user identifier (e. g. a ghost address).

FIG. 3 illustrates a flowchart 300 showing sending a crypto asset using a secret user identifier (e.g. a ghost address).

The process flow 300 starts at Block 302 and an actor, e.g. Staker Node, invokes an API on a Smart Contract including a secret user identifier (e.g. a ghost blockchain address), that can be used to determine a payment code.

The process flow 300 continues at block 304 where the smart contract calls the destination address creator oracle and passes it the secret user identifier (e.g. a ghost blockchain address).

The process flow 300 continues at block 306 where the destination address creator oracle returns a destination payment address.

The process flow 300 continues at the final block 308 where the smart contract uses the destination payment address to send crypto assets to.

The process flow 300 ends.

Figure 4:
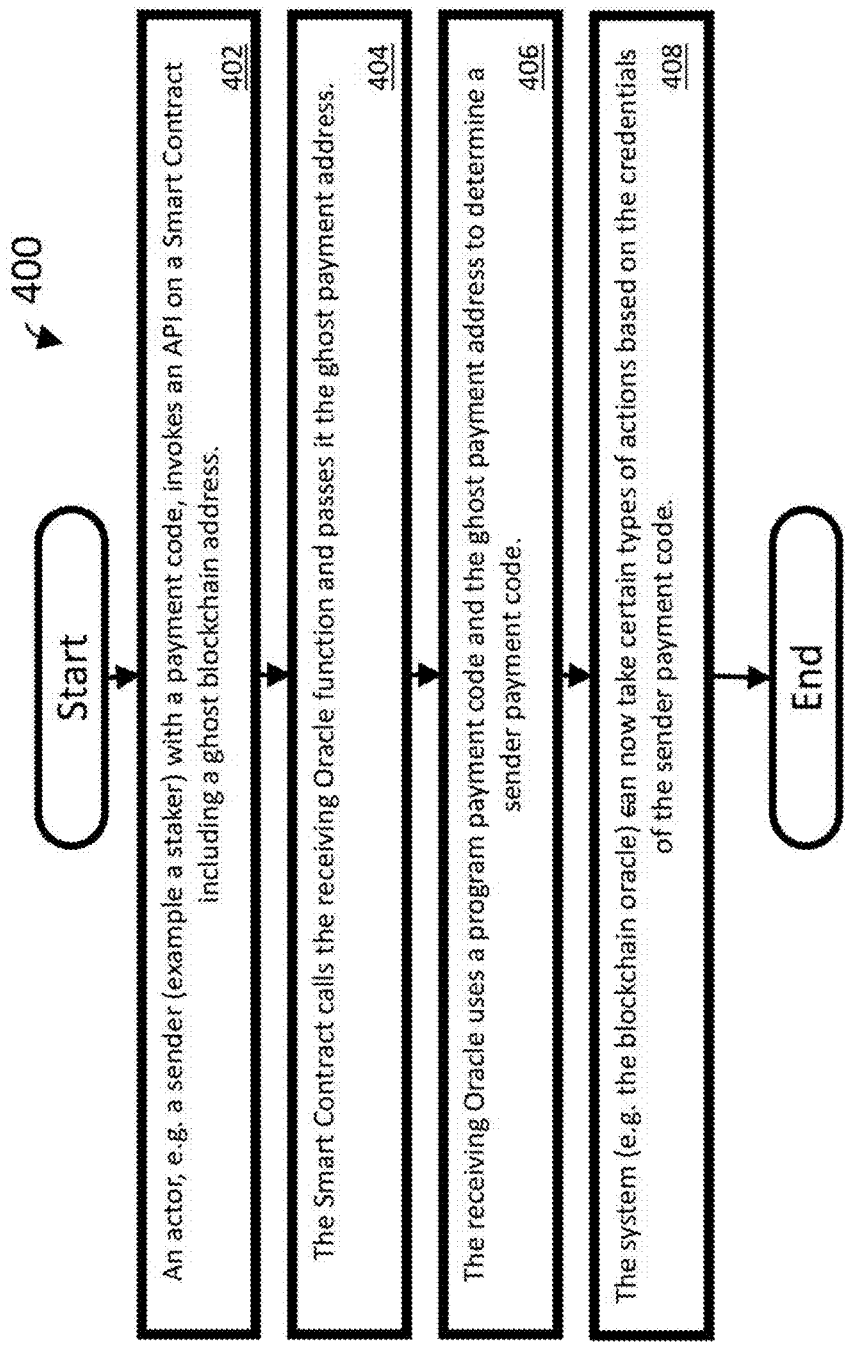
FIG. 4 Illustrates a flowchart showing receiving a crypto asset using a ghost payment address.

FIG. 4 Illustrates a flowchart showing receiving a crypto asset using a ghost payment address.

The process flow 400 starts at Block 402 where an actor, e.g. a sender (example a staker) with a payment code, invokes an API on a Smart Contract including a ghost blockchain address.

The process flow 400 continues at block 404 where the smart contract calls the receiving oracle function and passes it the ghost payment address.

The process flow 400 continues at block 406 where the receiving Oracle uses a program payment code and the ghost payment address to determine a sender payment code.

The process flow 400 continues at the final block 408 where the system (e.g. the blockchain oracle) can now take certain types of actions based on the credentials of the sender payment code.

The process flow 400 ends.

Presently and in the foreseeable future, global economies rely on centralized "value creators" offering services which is why users use these services. On problem the hybrid crypto system solves is bridging the gap between the modern value creation system and its consumers, where everyone desires to do so in a decentralized global environment supporting thousands of currencies. Hybrid crypto system may create a worldwide standard for off-blockchain and on-blockchain financial functionality that allows centralized value creators to do business in a globally decentralized crypto currency distributed finance system.

Definitions

A blockchain is a hash-chained series of blocks comprising a ledger. Each block contains a series of transactions (aka ledger entries), as well as the hash of the previous block in the chain. An attacker can never change any existing block, because that would necessarily give it a different hash, and since that hash appears in the next block, all subsequent blocks would be affected. The proof-of-work necessary for such an attack is untenable; it would impose an exorbitant cost on the fraudulent miner and in any case, would not gain him anything.

The biggest, most well-known blockchain, Bitcoin, exists as a peer-to-peer network, where each peer maintains its own, identical copy of the blockchain ledger. The peers are able to agree on the state of the ledger based on the axiom that the longest proof-of-work chain is the "true" one.

Since miners in Bitcoin are anonymous, they are also permissionless. There is no central authority with the power to decide who can mine and who can't. This "miner anonymity" is why Bitcoin is sometimes called a "permissionless" chain. In contrast, other protocols, such as Ripple/Stellar, make use of some central authority with the power to choose who can process transactions, and who cannot. Since these systems require centralized permission to authorize their validators, such systems are called "permissioned" for that reason. Due to this difference, they are also often referred to as "distributed ledgers" instead of as "blockchains". Put another way, a blockchain is a kind of distributed ledger. The distributed ledgers that are permissionless typically requires proof-of-work. Whereas Ripple/Stellar is permissioned distributed ledgers use a different protocol for achieving consensus instead of proof-of-work.

Another family of blockchains is based on the Ethereum network. The differentiator is that Ethereum scripts are Turing-complete, whereas Bitcoin scripts are Turing-incomplete. This basically means that Ethereum scripts are allowed to have loops in their code, and potentially infinite loops. Bitcoin disallows loops, because infinite loops would cause the mining rigs to freeze up for eternity. Ethereum solves this problem by allowing users to continually add "gas money" to a running script to pay for its continued operation. Ethereum miners are happy to continue running the script—even one containing an infinite loop—as long as they will continue to be paid for running it.

A coin is the base currency of any distributed ledger or blockchain. The best example of a coin is Bitcoin itself. Most other alt-coins are simply forks of the Bitcoin code. (They're all mostly the same under the hood). Examples include Litecoin, Bitcoin Cash, Dash, Dogecoin, etc.

Each of those blockchains has its own base currency. The base currency of the Bitcoin blockchain is BTC. The base currency of the Litecoin blockchain is LTC. The base currency of Bitcoin Cash is BCH, and so on.

The other distributed ledgers, such as Ripple, Stellar, and Ethereum, also have their own base coins (XRP, XLM, and ETH, respectively).

A token is a unit type that can be issued onto a blockchain and circulate on that chain just as the base coin circulates. There are different protocols for doing this. For example, the ERC-20 token protocol is used for issuing tokens onto the Ethereum blockchain. Similarly, the SLP token protocol is used for issuing tokens onto Bitcoin-family blockchains. For example, SLP could be used on Bitcoin Cash, or Litecoin, or Dash, etc., to issue tokens onto those blockchains.

A stablecoin is a token that is targeted to be redeemable 1-to-1 for some national currency (such as the dollar) by an issuer. For example, the Tether token, where each token is intended to be redeemable for one United States Dollar FINCEN (Financial Crimes Enforcement Network, a United States Government agency) recognizes "convertible virtual currencies" as any virtual currency that is convertible back into "real" currency, or that acts as a substitute for "real" currency.

FinCEN (Financial Crimes Enforcement Network, a United States Government agency) regulates any "virtual currency administrator" who has issued such a token and requires the issuer to have a money transmitter's license and to be AML/KYC compliant.

A security token is a token that represents some type of security. For example, a token may be redeemable for some commodity (such as gold), or it may represent stock in a company (security tokens may be regulated by the Securities and Exchange Commission SEC), or it may be the token has the promise that some future return as a result of "future efforts of the team.".

A utility token is "any token that isn't a security." However, the classical interpretation of the term usually includes the fact that the token is somewhere redeemable for some utility provided by the network. For example, Factoids are a utility token that users have to use in order to pay for storing data proofs in the Factom blockchain.

Another example of a utility token would be one that powers an ATM network. Which is to say, any transactions occurring on any of those ATMs would subtract a small transaction fee in the local currency and convert it to ATM tokens in order to pay for that ATM transaction.

Security tokens and utility tokens can also be used for fundraising, since the issuer can print up a number of new units and then, if there is demand for them, sell them and create market liquidity. The issuer can continue selling into growing demand, using his issued tokens to fund his operations and pay his employees. In these circumstances, the increasing market value of the token becomes the overriding concern.

This activity is regulated by the SEC wherever these tokens are sold to U.S. Persons.

It's possible for an issuer to create units of his tokens on multiple blockchains. For example, he may issue 100,000 units onto the Bitcoin Cash blockchain using the SLP protocol, and then issue another 100,000 units onto the Ethereum blockchain using the ERC-20 protocol. In this example, there are a total of 200,000 units in circulation, half on each chain.

This makes it possible for users to move their tokens from one blockchain to another. The issuer (or any other market maker) simply offers to trade the tokens 1-to-1, enabling users to convert tokens on one chain into tokens on another. In the user's experience, this conversion can also be managed "behind the scenes" by his wallet software, preventing any need for the user to consciously have to place market offers whenever he desires to move his tokens from one chain to another.

We note that cross chain tokens have yet to be created by anyone. We posit that this is true because there hasn't been a reliable cryptographically secure off chain system to move a token between chains.

A distributed ledger (also called a shared ledger or distributed ledger technology) is a consensus of replicated, shared, and synchronized digital data spread across multiple sites, countries, or institutions. The distributed ledger spread across several nodes (devices) on a peer-to-peer network, where each replicates and saves an identical copy of the ledger and updates itself independently. All blockchains are a form of distributed ledger. There are also non-blockchain distributed ledger tables.

With regard to the processes, systems, methods, heuristics, etc. described in this document, it should be understood that, although the document describes the steps of such processes, etc. as occurring in a certain sequence, in practice the processes might follow a different sequence. Further, although the system 100 may have described certain steps performed simultaneously, other steps may be added, or that certain steps described may be omitted. In other words, the descriptions of processes provided are for illustrating certain embodiments, and in no way limit the claims.

Accordingly, it is to be understood that the above description is intended to be illustrative and not restrictive. Many embodiments and applications other than the examples provided would be apparent upon reading the above description. The scope should not be determined with reference to the above description, but should instead be determined with reference to the appended claims, along with the full scope of equivalents to which such claims are entitled. It is anticipated and intended that future developments will occur in the technologies discussed in this document, and that the disclosed systems and methods will incorporate such future developments. In sum, it should be understood that the application is capable of modification and variation.

All terms used in the claims are intended to be given their broadest reasonable constructions and their ordinary meanings as understood by those knowledgeable in the technologies described unless there is an explicit indication to the contrary in this document. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, the following claims reflect inventive subject matter with less than all features of a single disclosed embodiment. The following claims are hereby incorporated into the Detailed Description, with each claim standing on its own as separately claimed subject matter.

The invention claimed is:

1. A hybrid crypto process comprising:
receiving at an on-chain smart contract function running on a distributed ledger a request that includes a secret user identifier,
calling a blockchain address oracle running on a computer server with arguments that include the secret user identifier, where the blockchain address oracle returns a distributed ledger address, and
the on-chain smart contract function uses the distributed ledger address in a distributed ledger transaction.

2. The hybrid crypto process of claim 1 where the request is a receive crypto assets request and the blockchain address oracle determines an actor public key seed from the secret user identifier.

3. The hybrid crypto process of claim 2 where:
the request includes a crypto asset amount,
the arguments include the crypto asset amount, the actor public key seed is a sender public key seed, and
the blockchain address oracle associates the crypto asset
amount with the sender public key seed.

4. The hybrid crypto process of claim 1 where the request is a send crypto assets request and the blockchain address oracle determines from the secret user identifier an actor public key seed, where the actor public key seed is a destination public key seed, and the blockchain address oracle returns a destination blockchain address.

5. The hybrid crypto process of claim 2 where, the actor public key seed is a user public seed key and associated to the actor public key seed is a user claim that is signed by a trusted private key, and in addition:
using the user claim for know your customer compliance.

6. The hybrid crypto process of claim 2 where, the actor public key seed is a user public key seed and associated to the user public key seed is a user claim signed by a trusted private key, and in addition:
using the user claim for anti-money laundering compliance.

7. The hybrid crypto process of claim 2 where, the actor public key seed is a program public seed key and associated to the program public key seed is a program claim, and in addition:
ensuring the program claim is signed by a trusted private key before executing some capability.

8. The hybrid crypto process of claim 1 where the on-chain smart contract function is invoked by a notary server running on another computer server, where the notary server uses cryptographic proof messaging to facilitate an off-chain transaction between two actor crypto addresses.

9. The hybrid crypto process of claim 1 where the secret user identifier enables privacy in on-blockchain transactions by generating receiving addresses deterministically using a Diffie-Hellman shared secret.

10. The hybrid crypto process of claim 1, where the blockchain address oracle uses a hierarchical deterministic tree of blockchain addresses to determine the distributed ledger address using the secret user identifier.

11. A hybrid crypto system comprising:
an on-chain smart contract running on a distributed ledger that accepts a secret user identifier, and
a blockchain address oracle running on a computer server that accepts a blockchain address, where associated to the blockchain address oracle is an oracle private key seed and the blockchain address oracle determines from the blockchain address an actor public key seed and calculates a shared secret number from the actor public key seed and the oracle private key seed, and
where the on-chain smart contract calls the blockchain address oracle, passing in the secret user identifier as the blockchain address.

12. The hybrid crypto system of claim 11 where the on-chain smart contract receives crypto assets and the actor public key seed is a sender public key seed.

13. The hybrid crypto system of claim 12 where:
the on-chain smart contract also accepts a crypto asset amount and
the blockchain address oracle also accepts a provided crypto asset amount,
where the blockchain address oracle associates the crypto asset amount with the sender public key seed.

14. The hybrid crypto system of claim 11 where the on-chain smart contract is sending crypto assets and the actor public key seed is a destination public key seed and the blockchain address oracle returns a destination blockchain address.

15. The hybrid crypto system of claim 11 where, the actor public key seed is a user public key seed and associated to the user public key seed is a user claim signed by a trusted private key, and in addition:
the hybrid crypto system uses the user claim for know your customer compliance.

16. The hybrid crypto system of claim 11 where, the actor public key seed is a user public key seed, and associated to the user public key seed is a user claim signed by a trusted private key, and in addition:
the hybrid crypto system uses the user claim for anti-money laundering compliance.

17. The hybrid crypto system of claim 11 where the blockchain address oracle generates destination addresses for sending crypto assets to actor crypto addresses without requiring the actor crypto addresses to appear in any on-blockchain transactions.

18. The hybrid crypto system of claim 11, where the blockchain address oracle generates the distributed ledger address by:
deriving a master key from the shared secret number;
generating a hierarchical deterministic tree of blockchain addresses from the master key; and
selecting the distributed ledger address from the hierarchical deterministic tree.

19. A hybrid crypto process comprising:
calling a blockchain address oracle from a smart contract, where the smart contract is running on a distributed ledger with arguments that include a secret user identifier, where associated to the blockchain address oracle is an oracle public key seed and the blockchain address oracle determines from the secret user identifier a user public key seed.

20. A hybrid crypto system comprising:
a first computer server comprising a processor and memory storing instructions that, when executed, implement an off-chain program with a user public key seed, where the off-chain program generates a secret user identifier associated to the user public key seed,
a second computer server comprising a processor and memory storing instructions that, when executed, implement a blockchain address oracle running on a second computer server with arguments that include the secret user identifier, where the blockchain address oracle determines from the secret user identifier the user public key seed, and
a distributed ledger network comprising multiple computing nodes that collectively implement an on-chain smart contract,
where the off-chain program calls the on-chain smart contract and provides the secret user identifier, the on-chain smart contract calls the blockchain address oracle and provides the secret user identifier, and the on-chain smart contract receives back from the blockchain address oracle a destination address.

21. The hybrid crypto system of claim 20 where the instructions of the first computer server, when executed, implement the off-chain program as a notary server that processes off-blockchain transactions secured by cryptographic proofs, and the notary server is associated with a notary crypto address.

22. The hybrid crypto system of claim 20 where the secret user identifier enables the on-chain smart contract to send crypto assets to the user public key seed without the user public key seed appearing in any on-blockchain transaction, thereby preserving privacy while maintaining a mathematically provable audit trail.

\* \* \* \* \*